(12) United States Patent
Tabuchi et al.

(10) Patent No.: US 6,913,538 B2
(45) Date of Patent: Jul. 5, 2005

(54) TORQUE TRANSMISSION SYSTEM

(75) Inventors: Yasuo Tabuchi, Toyoake (JP); Kiyoshi Kurohata, Kariya (JP); Koichi Hashinaga, Pulling (DE); Dieter Kuhn, Wolnzach (DE); Volker Friedrich, Moosburg (DE); Thomas Rauth, Hockenheim (DE)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/144,761

(22) Filed: May 15, 2002

(65) Prior Publication Data

US 2002/0198056 A1 Dec. 26, 2002

(30) Foreign Application Priority Data

May 22, 2001 (JP) ........................................ 2001-153092

(51) Int. Cl.$^7$ .............................. F16D 9/00; F16D 3/58
(52) U.S. Cl. ......................... 464/32; 464/81; 417/319; 474/94
(58) Field of Search .............................. 464/30, 32, 73, 464/81; 403/2, 11, DIG. 3; 417/319; 192/150; 474/94, 202

(56) References Cited

U.S. PATENT DOCUMENTS

| | | | |
|---|---|---|---|
| 2,438,676 A | 3/1948 | Nickel et al. | |
| 3,472,046 A | * 10/1969 | Potter ........................ | 464/32 |
| 4,445,606 A | 5/1984 | Van Laninghan | |
| 4,543,074 A | 9/1985 | Ville et al. | |
| 4,859,156 A | * 8/1989 | Kikuchi ...................... | 417/319 |
| 5,036,964 A | 8/1991 | Booth et al. | |
| 5,443,372 A | * 8/1995 | Kanoll ........................ | 417/319 |
| 5,800,137 A | * 9/1998 | Eitai et al. .................. | 417/319 |
| 6,068,452 A | 5/2000 | Okada et al. | |
| 6,077,048 A | 6/2000 | Okada et al. | |
| 6,332,842 B1 | 12/2001 | Tabuchi et al. | |
| 6,336,883 B1 | 1/2002 | Beve et al. | |
| 6,500,085 B2 | * 12/2002 | Kawachi .................... | 474/199 |

FOREIGN PATENT DOCUMENTS

| | | |
|---|---|---|
| DE | 84 33 502 | 4/1986 |
| JP | A-10-252857 | 9/1998 |

OTHER PUBLICATIONS

U.S. Appl. No. 10/072,949, filed Feb. 12, 2002, Tabuchi et al.

* cited by examiner

*Primary Examiner*—Kenn Thompson
(74) *Attorney, Agent, or Firm*—Posz Law Group, PLC

(57) ABSTRACT

In a torque transmission system, plural engagement pieces elastically deformable are formed integrally with an outer peripheral portion of a circular portion of a center hub to be engaged with an inner periphery portion of a pulley. A bridge portion of the center hub is disposed to be broken when a torque large than a predetermined torque is applied there to. Since the engagement protrusion pieces are engaged with a part of the pulley, it can prevent the center hub from being removed and falling when the bridge portion of the center hub is broken.

16 Claims, 12 Drawing Sheets

TORQUE TRANSMISSION SYSTEM

CROSS-REFERENCE TO RELATED APPLICATION

This application is based on and incorporates herein by reference Japanese Patent Application No. 2001-153092 filed on May 22, 2001.

BACKGROUND OF THE INVENTION

1. Field of the Invention

The present invention relates to a torque transmission system that transmits torque generated by a driving unit such as an engine to a driven unit such as a compressor.

2. Description of Related Art

The Applicant of the present invention proposes a torque transmission system having a torque limit function which interrupts a torque transmission when the transmitted torque becomes larger than a predetermined torque. However, when the torque limit function operates, a force for holding a torque transmitting member disappears, and a part of the torque transmitting member may be removed from the torque transmission system.

SUMMARY OF THE INVENTION

In view of the foregoing problems, it is an object of the present invention to provide a torque transmission system which prevents a part of a torque transmitting member from being removed and falling even when a torque limit function operates.

According to the present invention, in a torque transmission system for transmitting torque from a driving unit to a driven unit, a rotation member is rotated by torque from the driving unit, and a torque transmitting member is connected to a shaft of the driven unit, for transmitting torque from the rotation member to the shaft. The torque transmitting member is disposed to be broken when the torque transmitted from the rotation member is larger than a predetermined torque, and a prevention member is disposed to prevent the torque transmitting member from being removed when the torque transmitting member is broken. That is, even when a torque limit function operates so that the torque transmitting member is broken, it can prevent a part of the torque transmitting member from being removed and falling from the torque transmission system. Here, the rotation member can be used as a first rotation member, and the torque transmitting member can have a second rotation member (i.e., cylindrical portion) rotated integrally with the shaft of the driven member. Even in this case, the prevention member can prevents a part of the torque transmitting member from being separated from the torque transmission system.

Preferably, the torque transmitting member includes a circular portion having a plurality of protrusion portions to which torque supplied from the rotation member is received, and a bridge portion through which the circular portion is mechanically connected to the cylindrical portion. In addition, the prevention member is at least an engagement protrusion piece elastically deformable to be engaged with a part of the rotation member. Therefore, a sufficient torque can be transmitted through the torque transmitting member while assembling performance of the torque transmission system is made simple.

The rotation member includes a rim member having an approximate ring shape for receiving torque, a bearing portion disposed inside the rim portion, and a connection portion connecting the bearing portion and the rim portion. In this case, the prevention member can be a stopper member having an approximate ring shape, and is attached to the rim portion to contact the circular portion. Therefore, the prevention member can be readily attached to the rim portion while preventing the torque transmitting member from being removed even when the torque limit function operates.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

The present invention will be described in detail with reference to various embodiments.

(First Embodiment)

Figure 1:
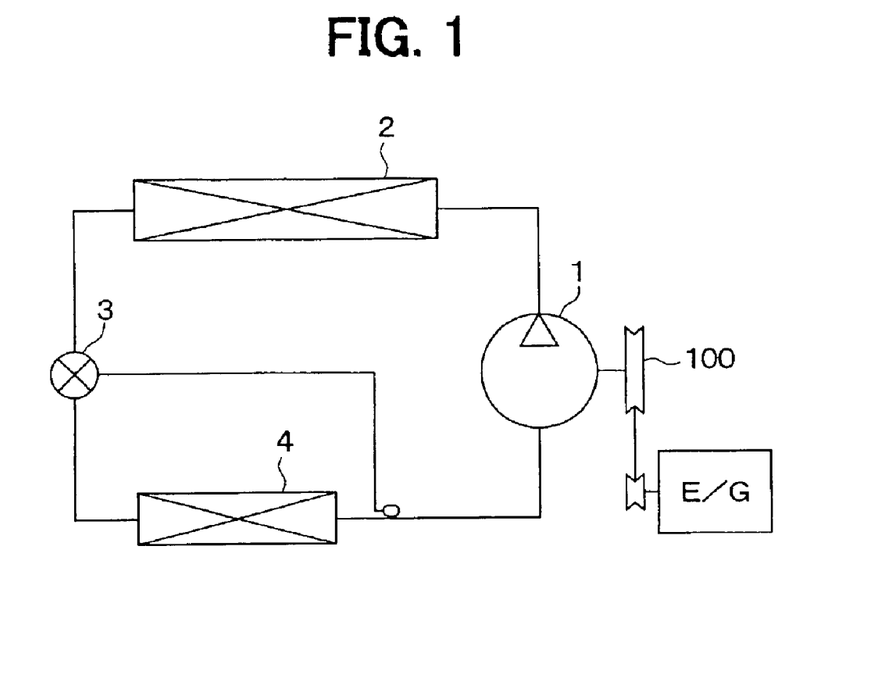
FIG. 1 is a schematic diagram showing a refrigerant cycle for a vehicle air conditioner, according to embodiments of the present invention.

In the first embodiment, the present invention is typically applied to a torque transmission system (power transmission system) for transmitting power from a vehicle engine E/G to a compressor of a vehicle air conditioner. As shown in FIG. 1, in a refrigerant cycle of the vehicle air conditioner, a capacity-variable compressor 1 sucks and compresses refrigerant, a radiator 2 (condenser) cools and condenses refrigerant discharged from the compressor 1, a pressure-reducing unit 3 decompresses refrigerant discharged from the radiator 2, and an evaporator 4 is disposed to evaporate refrigerant decompressed in the pressure-reducing unit 3 to obtain cooling capacity. In this embodiment, a thermal expansion valve is used as the pressure-reducing unit 3. The thermal expansion valve adjusts a valve opening degree thereof so that refrigerant at an outlet side of the evaporator 4 has a predetermined heating degree.

Figure 2A:
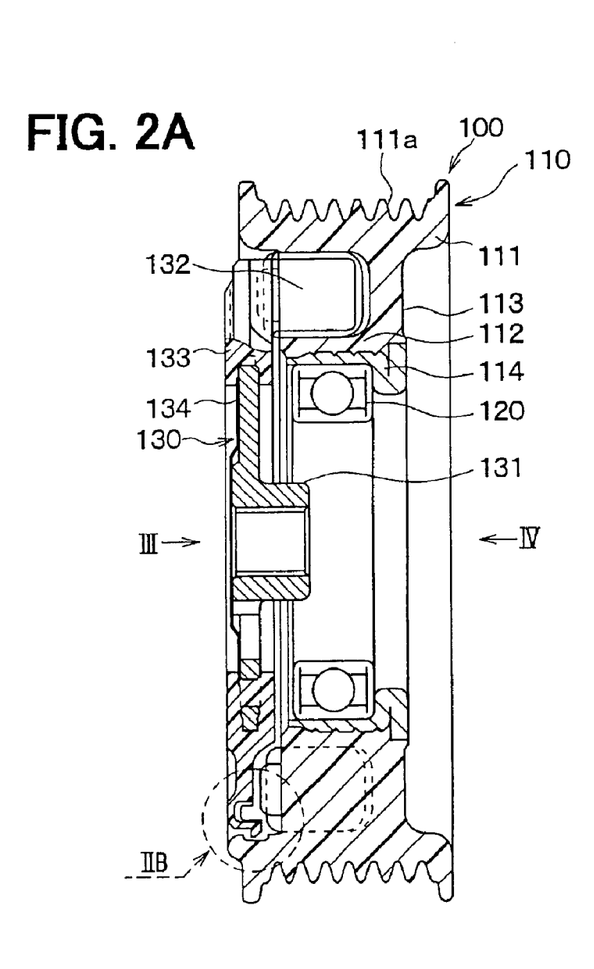
FIG. 2A is a sectional view showing a torque transmission system according to a first embodiment of the present invention.

Power transmitted from the engine E/G through a V-belt (not shown) is further transmitted to the compressor 1 through a pulley-integrated torque transmission system 100. That is, a pulley 110 is integrally provided in the torque transmission system 100. The pulley 110 (first rotation member) shown in FIG. 2A is made of a metal or a hard resin (e.g., phenol resin in this embodiment). The pulley 110 includes an approximately cylindrical rim portion 111 provided with V-shaped grooves 111a corresponding to a V-ribbed belt, an approximately cylindrical pulley hub 112 disposed inside the rim portion 110, and a circular flange portion 113 (spoke portion) connecting the rim portion 111 and the pulley hub 112. A radial-rolling bearing 120 is attached to the pulley hub 111 to rotatably support the pulley 110.

A metal sleeve 114, to which the bearing 120 is attached, is disposed at an inner radial side of the pulley hub 112. While the flange portion 113 and the pulley hub 112 are molded by the resin, the metal sleeve 114 is inserted at a predetermined position, so that the sleeve 114 is integrated with pulley hub 112 by an insert-molding. An inner part of the radial-rolling bearing 120 is press-fitted to a front housing of the compressor 1.

A center hub 130 is used as a torque transmitting member in the torque transmission system. The center hub 130 can be coaxially disposed inside the pulley 110, as shown in FIG. 2A. The center hub 130 includes a cylindrical portion 131 (second rotation member) made of a metal, a circular portion 133 made of a resin, and a bridge portion 134 (flange portion, torque transmitting member) formed into an approximate circular ring shape. The cylindrical portion 131 is provided with a female screw connected to a male screw on the outer peripheral surface of the shaft of the compressor 1. The circular portion 133 is provided with plural protrusion portions 132 to which torque supplied from the pulley 110 is received. The circular portion 133 and the cylindrical portion 131 are mechanically connected to each other through the bridge portion 134, so that torque is transmitted from the circular portion 133 to the cylindrical portion 131 through the bridge portion 134. The mechanical strength of the bridge portion 134 is set such that the flange 134 is broken (damaged) when the torque transmitted from the circular portion 133 to the cylindrical portion 131 exceeds a predetermined threshold value.

In this embodiment, the cylindrical portion 131 and the bridge portion 134 are molded integrally by using a metal, and the circular portion 133 is molded by using a resin, for example. In this case, the bridge portion 134 and the circular portion 133 are integrated by an insert-molding.

Figure 5:
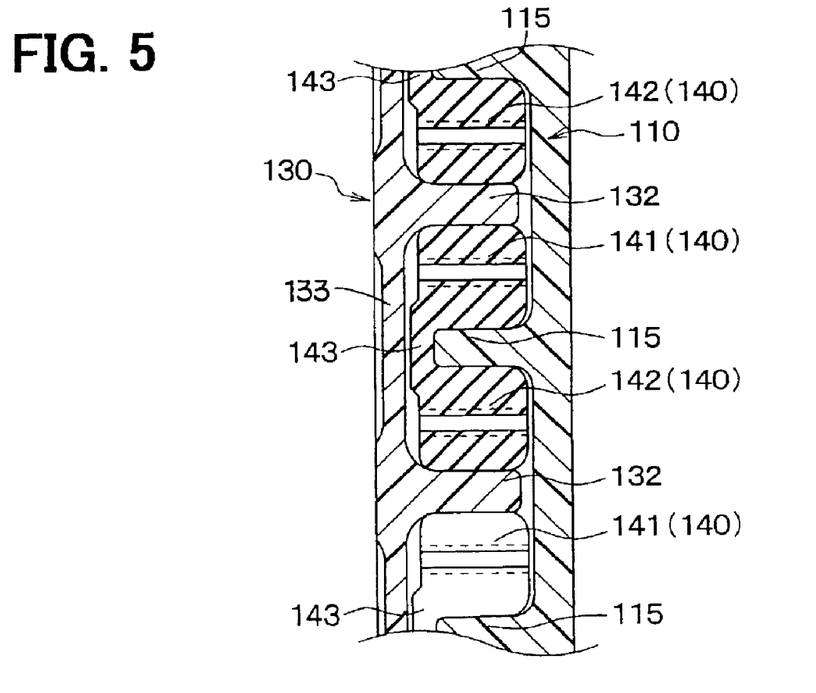
FIG. 5 is a cross-sectional view taken along the line V—V in FIG. 3.

Plural protrusion portions 115 protruding toward from the pulley 110 toward the circular portion 133 (center hub 130) are formed integrally with the pulley 110, as shown in FIG. 5. In a state where the pulley 110 and the center hub 130 are attached to the compressor 1, the protrusion portions 132 of the center hub 130 and the protrusion portions 115 of the pulley 110 are positioned alternately around the shaft (rotation shaft).

Each of Dampers 140 for transmitting torque from the pulley 110 to the center hub 130 is disposed between adjacent two protrusion portions 115 and 132, and is made of an elastic material such as EPDM (ethylene-propylene-diene ternary polymerization rubber). Each of the dampers 140 is constructed by a first damper 141, a second damper 142 and a connection member 143 connecting the first damper 141 and the second damper 142. The first damper 141 transmits torque from the protrusion portion 115 of the pulley 110 to the protrusion portion 132 of the center hub 130 while being compression-deformed due to a compression load, when the pulley 110 rotates relative to the center hub 130 in a forward direction (i.e., the direction R shown in FIGS. 3 and 4) when the compressor 1 is driven. The second damper 142 is compression-deformed due to compression load when the pulley 110 rotates in a reverse direction reverse to the forward direction R, relative to the center hub 130. A pair of the first damper 141 and the second damper 142 are connected to each other by the connection member 143 to form the damper 140. Plural dampers 140 are arranged in a circumferential direction of the pulley 110, as shown in FIG. 4.

Figure 4:
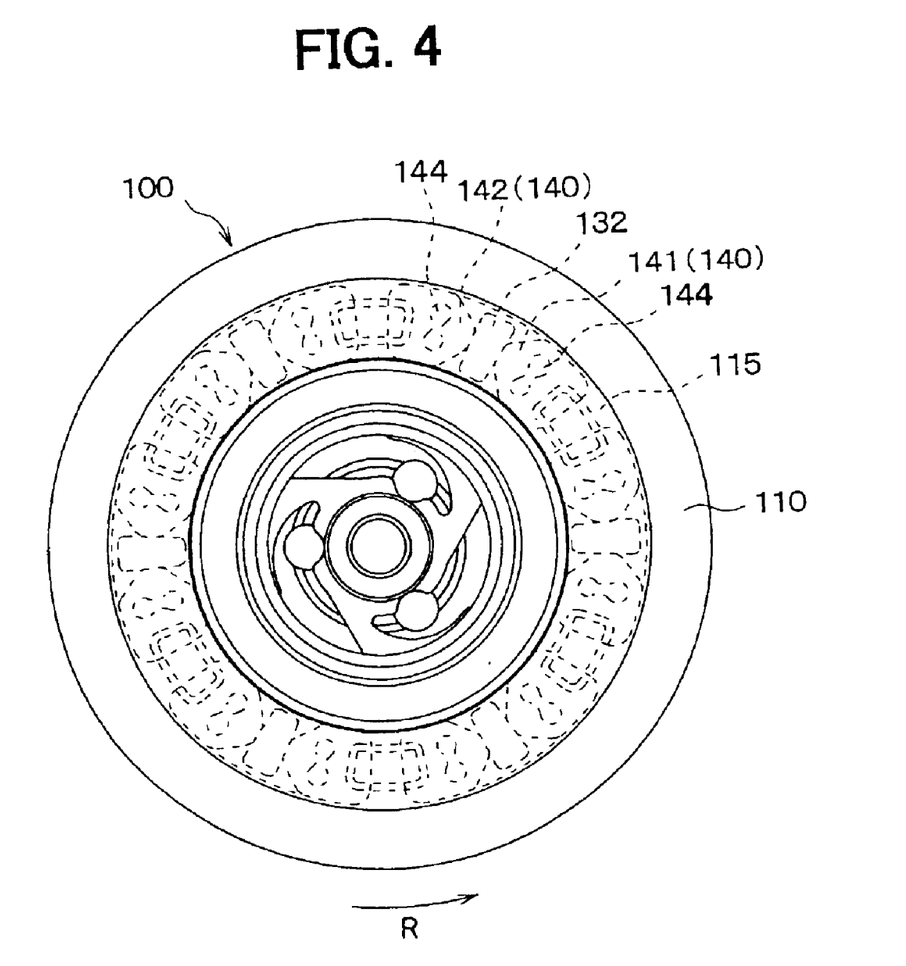
FIG. 4 is a side view of the torque transmission system when being viewed from the arrow IV in FIG. 2A.

As shown in FIG. 4, hollow portions 144 are provided in the dampers 140 (i.e., first damper 141 and the second damper 142), so that the elastic coefficient k of the damper 140 is non-linearly changed to become gradually larger. By providing the hollow portions 144 in the dampers 140, the sectional area of the damper 140 in a direction perpendicular to a compression load direction is reduced, or is partially reduced, as the damper 140 is toward the top end side of the compression load direction. The elastic coefficient k is a change rate K ($=\Delta T/\Delta \theta$) of a transmission torque T transmitted between the pulley 110 and the center hub 130, relative to a relative rotation angle $\theta$ of the pulley 110 relative to the center hub 130.

Figure 2B:
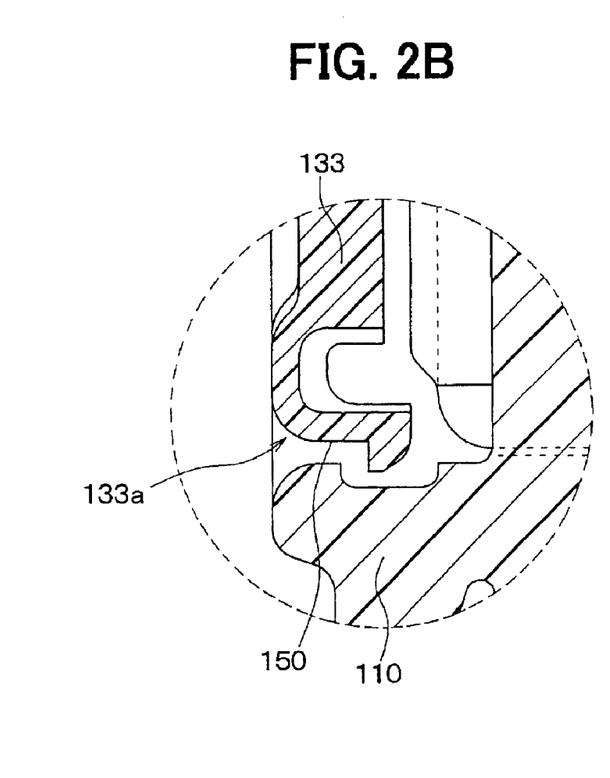
FIG. 2B is an enlarged view of the part shown by IIB in FIG. 2A.

As shown in FIG. 2B, an elastically-deformable engagement protrusion piece 150 engaging with an inner peripheral portion of the pulley 110 is formed integrally with an outer peripheral portion 133a of the circular portion 133. Here, plural engagement protrusion pieces 150 can be provided in the outer peripheral portion 133a of the circular portion 133 at plural positions to be engaged with a part of the pulley 110, so that it can prevent a part (outer radial side) of the center hub 130 from being removed from the pulley 110 when the bridge portion 134 is broken.

Next, operation of the torque transmission system 100 according to the first embodiment will be now described. Torque transmitted to the pulley 110 in the forward direction through the V-belt, is transmitted to the first damper 141, and is further transmitted to the center hub 130 while the first damper 141 is compression deformed. On the other hand, torque in the reverse direction is transmitted from the center hub 130 to the pulley 110 by the compression-deformation of the second damper 142. Accordingly, torque variation in the forward direction and or in the reverse direction can be absorbed by the elastic deformation of the first and second dampers 141, 142 (damper 140). When the transmission torque in the forward direction or the reverse direction is more than a predetermined torque, the bridge portion (bridge portion) 134 is broken to interrupt the torque transmission between the pulley 110 and the center hub 130.

According to the first embodiment of the present invention, the elastically-deformable engagement protrusion pieces 150 are integrally formed with the outer periphery portion 133a of the circular portion 133 to be engaged with the inner periphery portion of the pulley 110. Since the engagement protrusion pieces 150 are engaged with a part of the pulley 110, it can prevent the radial outer side of the center hub 130 (the side of the circular portion 133) from being removed and from falling from the pulley 110 when the bridge portion 134 (flange portion) is broken. Generally, since the radial inner side (the side of the cylindrical portion 131) of the center hub 130 is fixed to the shaft of the compressor 1, it is not removed even when the bridge portion 134 is broken.

Figure 3:
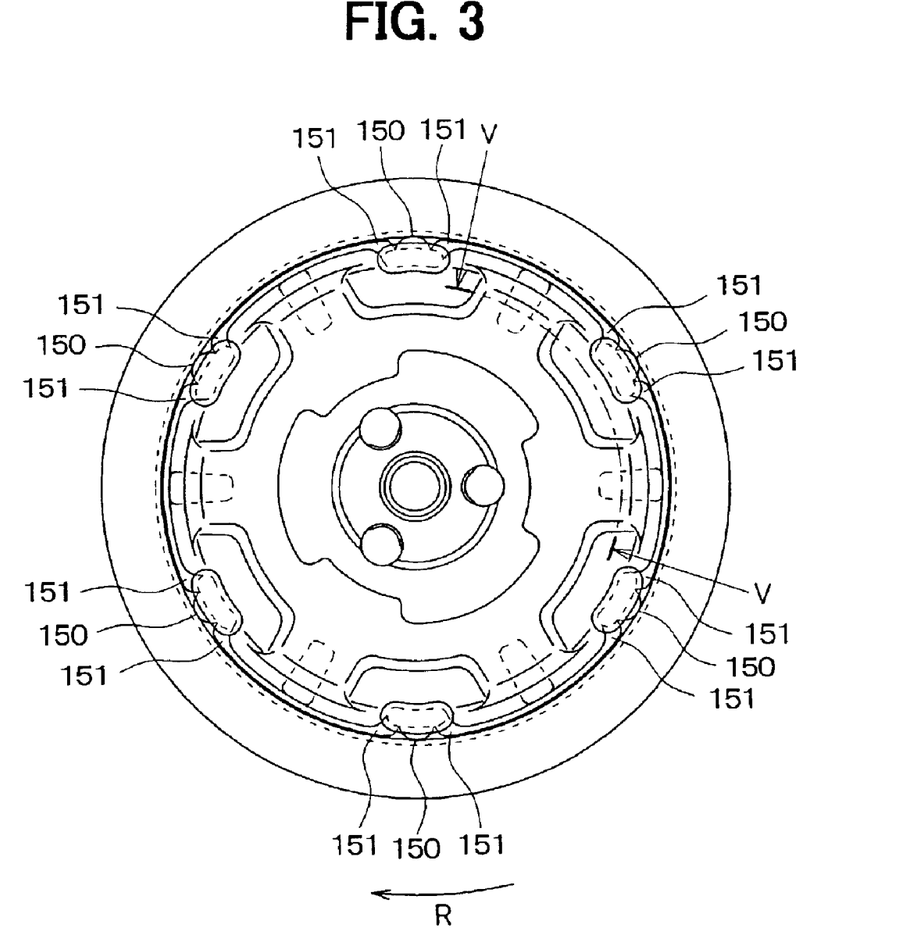
FIG. 3 is a side view of the torque transmission system when being viewed from the arrow III in FIG. 2A.

According to the first embodiment, the engagement protrusion pieces 150 are elastically deformed so that the center hub 130 is readily assembled to the pulley 110. In the first embodiment, as shown in FIG. 3, recesses 151 are provided in the circular portion 133 at positions where the engagement protrusion pieces 151 are provided, so that the strength of the circular portion 133 is reduced. However, when the strength of the circular portion 133 is excessively reduced, the circular portion 133 is readily deformed, and torque may not be sufficiently transmitted.

In the first embodiment, the plural engagement protrusion pieces 150 are provided in the outer peripheral portion 133a of the circular portion 132 at positions corresponding to positions between the protrusion portions 132. Therefore, it can prevent the strength on the base side of the protrusion portions 132 of the circular portion 133 from being excessively reduced. Accordingly, the engagement protrusion pieces 150 can be elastically deformed, while sufficient torque can be transmitted.

According to the first embodiment of the present invention, because it is unnecessary to provide a hole in the bridge portion 113 of the pulley 110, it can prevent a foreign material such as rain and dust from being introduced into the pulley 110. Further, because the engagement protrusion pieces 150 are formed integrally with the circular portion 133, the number of components and assembling steps of the torque transmission system can be reduced.

(Second Embodiment)

Figure 6A:
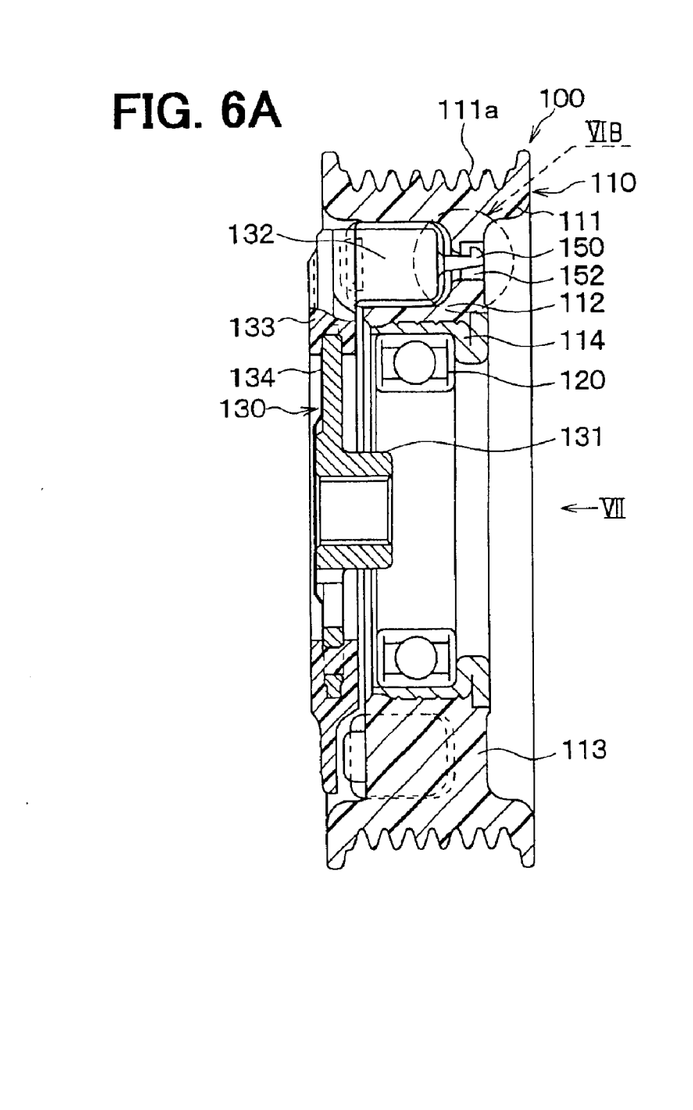
FIG. 6A is a sectional view showing a torque transmission system according to a second embodiment of the present invention.
Figure 6B:
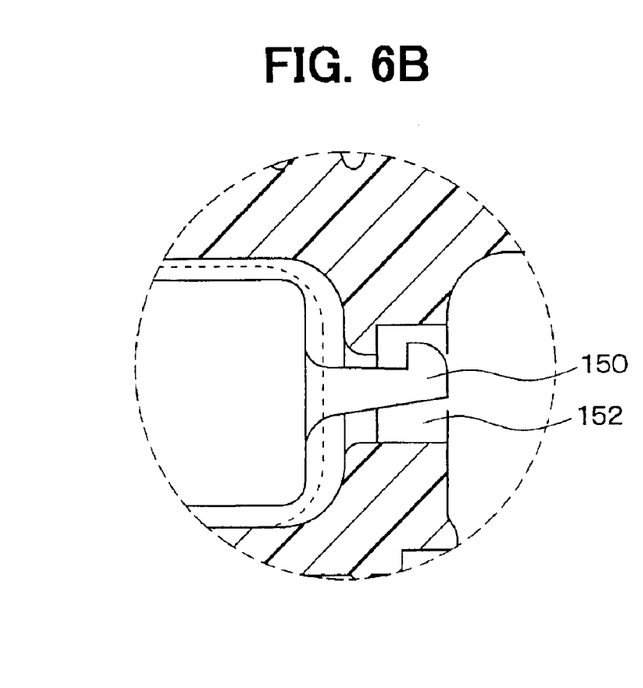
FIG. 6B is an enlarged view of the part shown by VIB in FIG. 6A.
Figure 7:
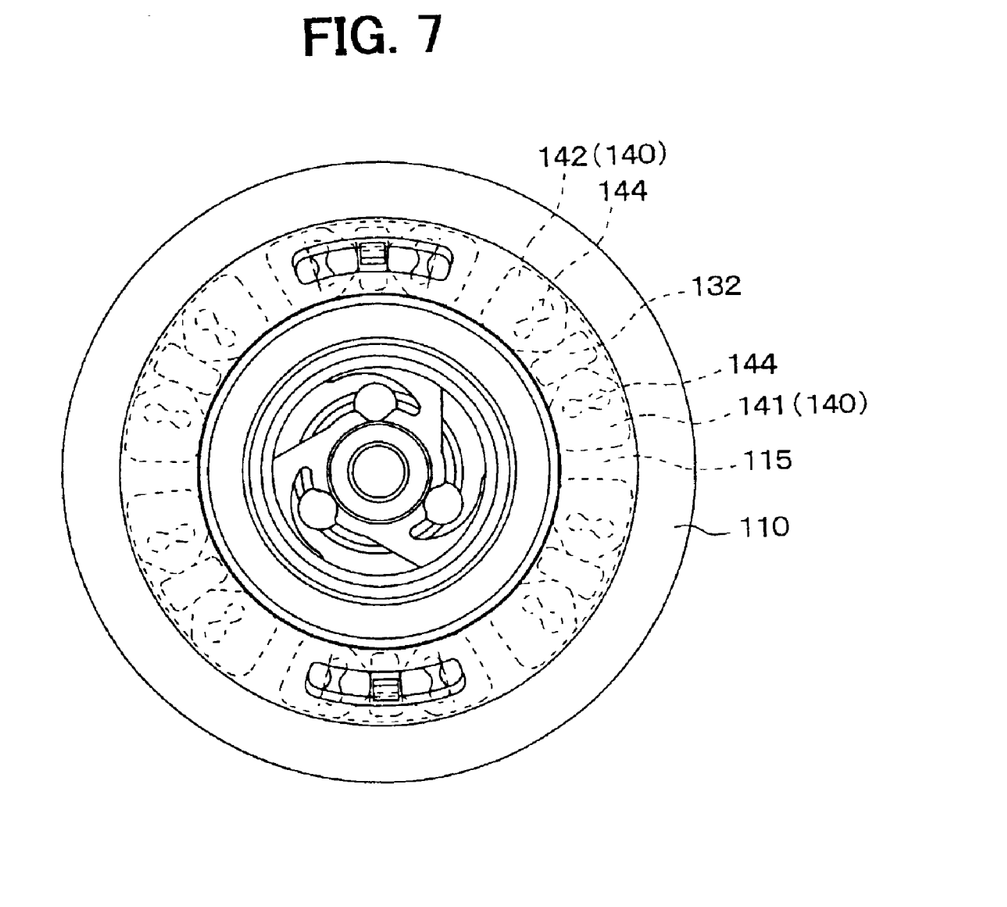
FIG. 7 is a side view when being viewed from the arrow VII in FIG. 6A.
Figure 8A:
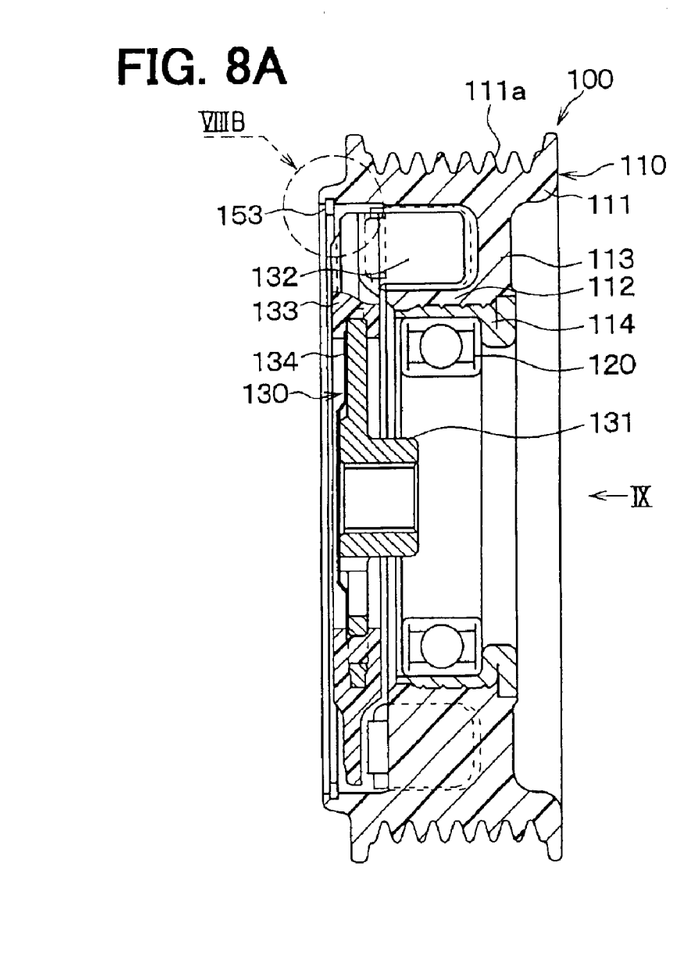
FIG. 8A is a sectional view showing a torque transmission system according to a third embodiment of the present invention.
Figure 8B:
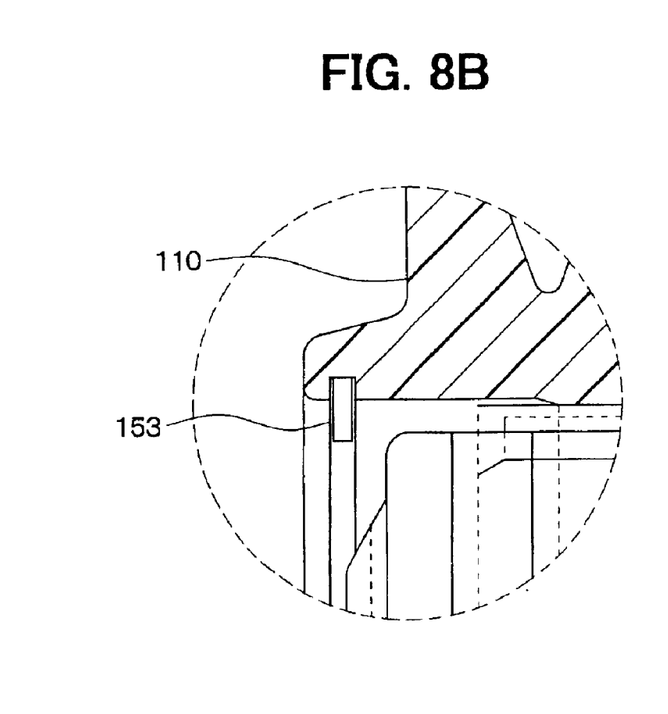
FIG. 8B is an enlarged view of the part shown by VIIIB in FIG. 8A.
Figure 9:
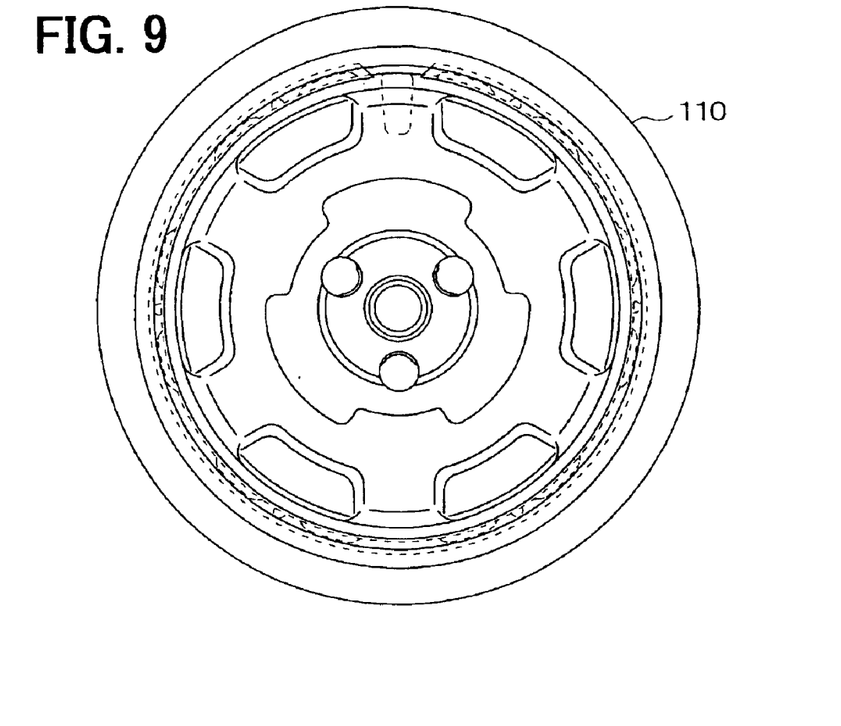
FIG. 9 is a side view when being viewed from the arrow IX in FIG. 8A.
Figure 10:
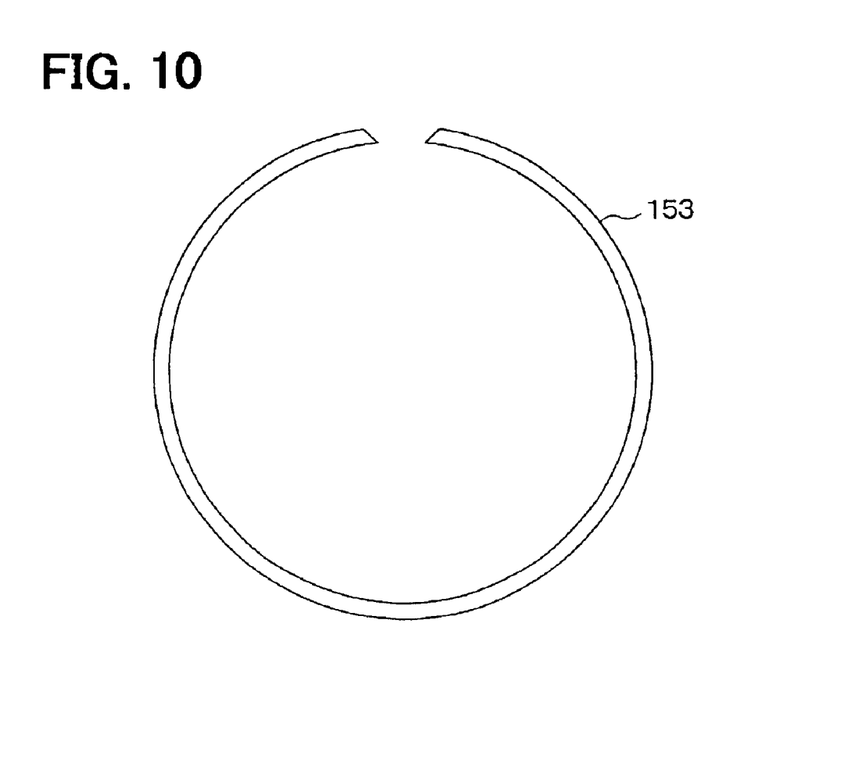
FIG. 10 is a front view of a stopper ring according to the third embodiment.
Figure 11A:
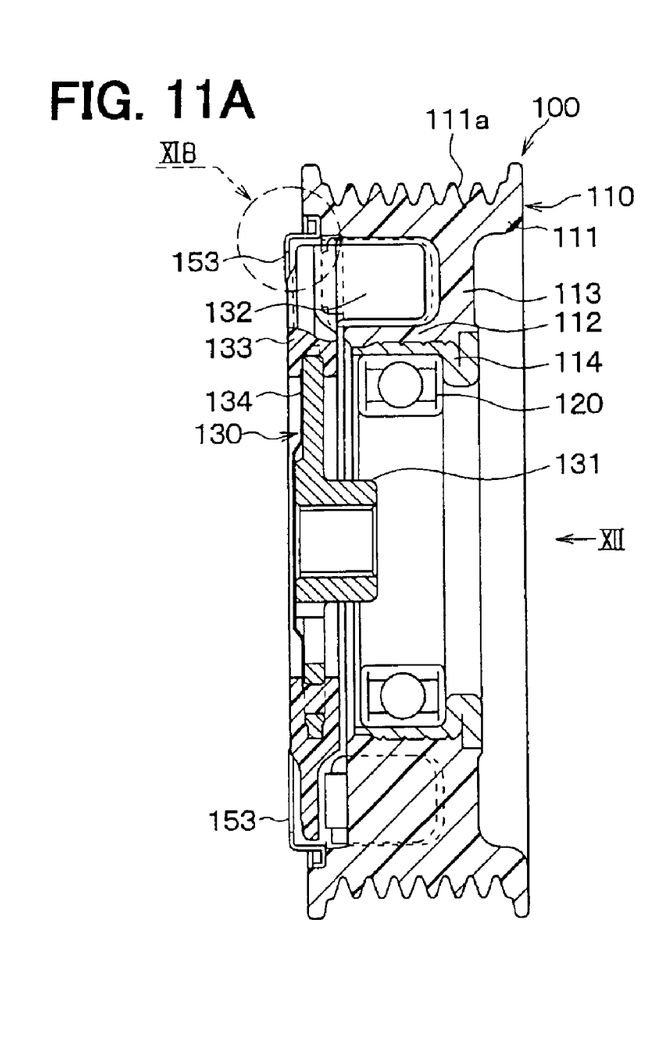
FIG. 11A is a sectional view showing a torque transmission system according to a fourth embodiment of the present invention.
Figure 11B:
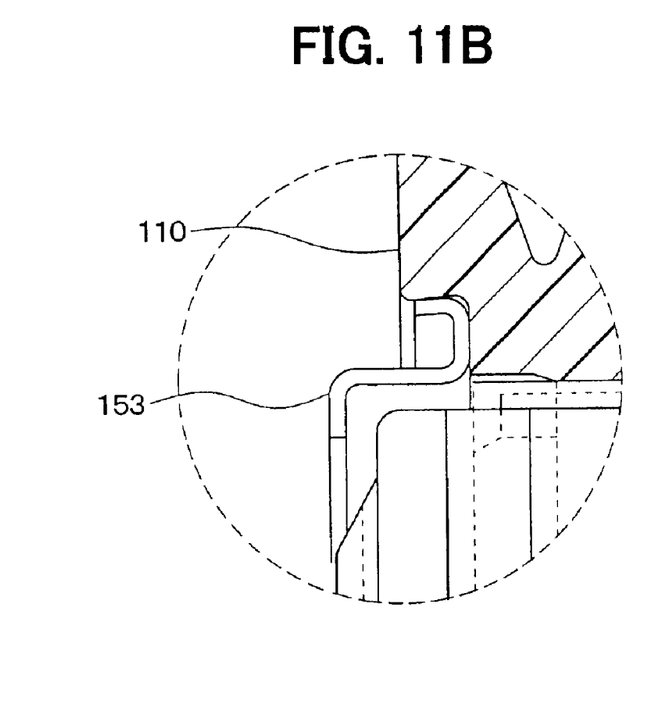
FIG. 11B is an enlarged view of the part shown by XIB in FIG. 11A.
Figure 12:
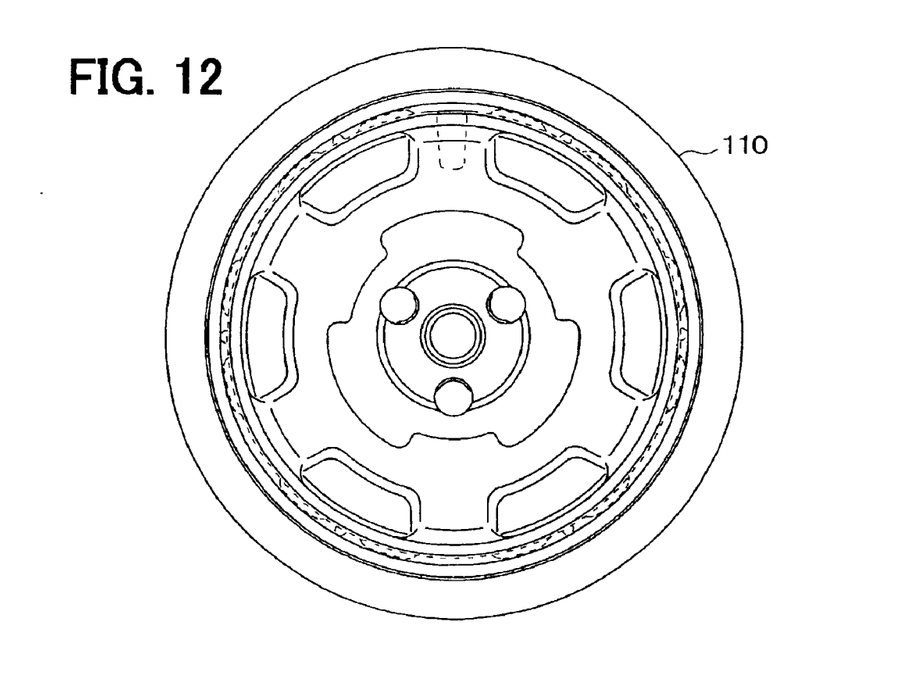
FIG. 12 is a side view when being viewed from the arrow XII in FIG. 11A.
Figure 13:
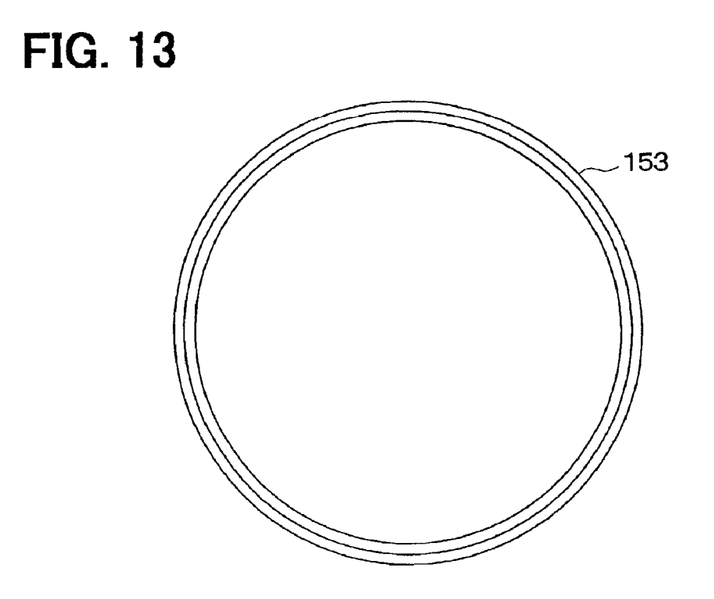
FIG. 13 is a front view of a stopper ring according to the fourth embodiment.
Figure 14A:
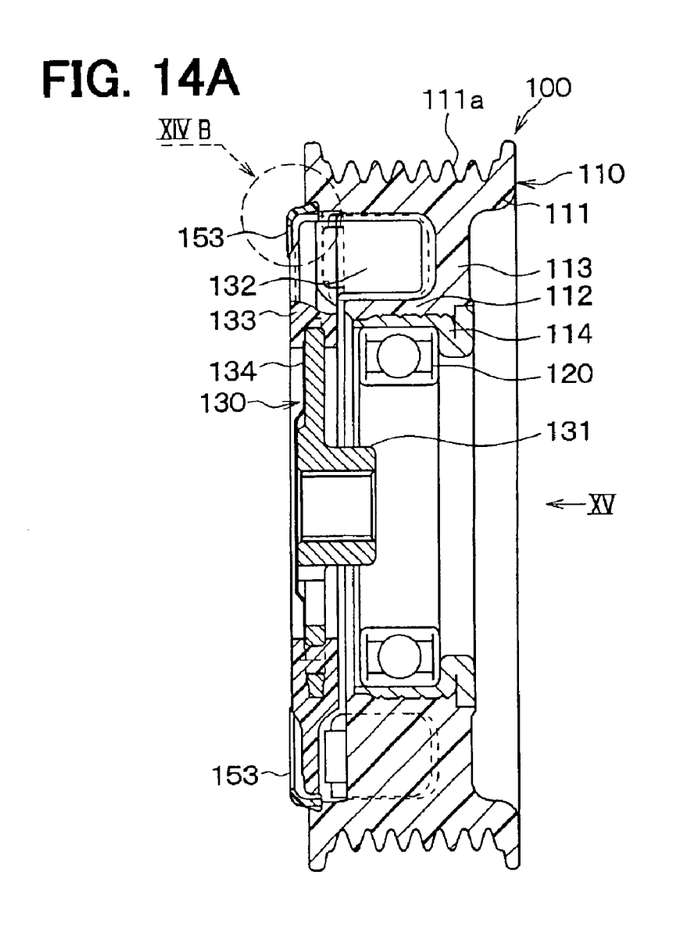
FIG. 14A is a sectional view showing a torque transmission system according to a fifth embodiment of the present invention.
Figure 14B:
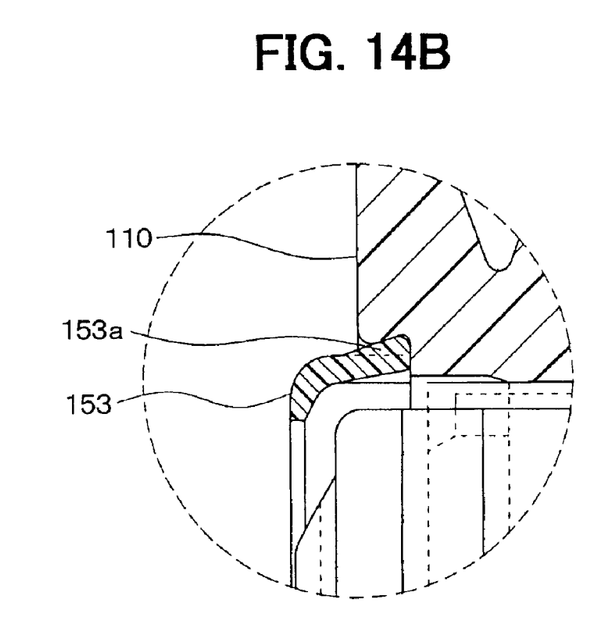
FIG. 14B is an enlarged view of the part shown by XIVB in FIG. 14A.
Figure 15:
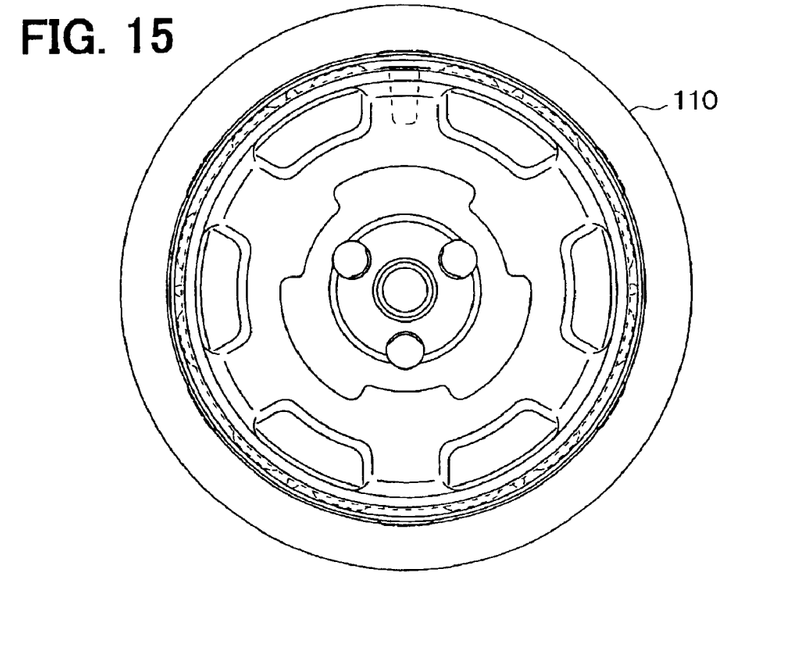
FIG. 15 is a side view when being viewed from the arrow XV in FIG. 14A.
Figure 16:
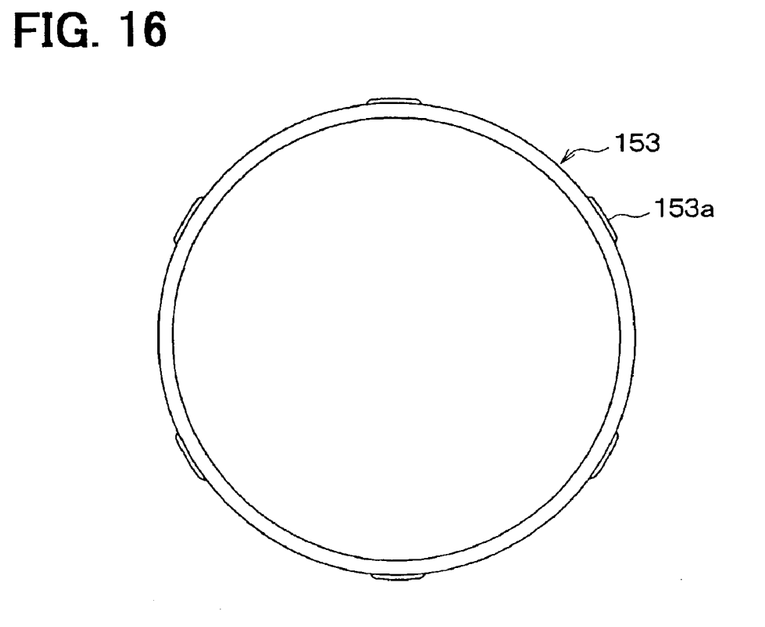
FIG. 16 is a front view of a stopper ring according to the fifth embodiment of the present invention.

The second embodiment of the present invention will be now described with reference to FIGS. 6A, 6B and 7. In the second embodiment, an engagement protrusion piece 150 is provided in the top end of each protrusion portion 132, and an engagement hole into which the engagement protrusion piece 150 is inserted is provided in the flange portion 113 of the pulley 110. In the second embodiment, since plural engagement protrusion pieces 150 are formed integrally with the protrusion portions 132 to protrudes from the top ends of the protrusion portions 132, the plural engagement protrusion pieces 150 are readily formed.

In the second embodiment, since the engagement protrusion pieces 150 are provided at the top ends of the protrusion portions 132, the strength of the circular portion 133 is not excessively reduced due to the engagement protrusion pieces 150. In the second embodiment, the other parts are similar to those of the above-described first embodiment.

(Third Embodiment)

The third embodiment of the present invention will be now described with reference to FIGS. 8A, 8B, 9 and 10. In the third embodiment, a stopper ring 153 formed into an approximate ring shape is attached to the rim portion 111 to press-contact the circular portion 133. The stopper ring 153 is made of a spring steel or a resin to construct a removing prevention member for preventing a part of the center hub 130 from being removed. In the third embodiment, when the stopper ring 153 is attached to the rim portion 111, the stopper ring 153 is elastically deformed so that a curvature radius of the whole stopper ring 153 becomes smaller. Therefore, the stopper ring 153 can be readily attached to the rim portion 111.

In the third embodiment, the other parts are similar to those of the above-described first embodiment.

(Fourth Embodiment)

The fourth embodiment of the present invention will be now described with reference to FIGS. 11A, 11B–13. In the fourth embodiment, similarly to the above-described third embodiment, a stopper ring 153 formed into an approximate ring shape is attached to the rim portion 111 of the pulley to contact the circular portion 133. The stopper ring 153 is made of a spring steel or a resin to construct a removing prevention member. In the fourth embodiment, the stopper ring 153 is mainly elastically deformed radial outside to be attached to the rim portion 111, so that the circular portion 133 is held by the stopper ring 153 attached to the rim portion 111. In the fourth embodiment, the other parts are similar to those of the above-described first embodiment.

(Fifth Embodiment)

The fifth embodiment of the present invention will be now described with reference to FIGS. 14A, 14B–16. In the fifth embodiment, similarly to the above-described third and fourth embodiments, a stopper ring 153 formed into an approximate ring shape is attached to the rim portion 111 to contact the circular portion 133. The stopper ring 153 is made of a spring steel or a resin to construct a removing prevention member. In the fifth embodiment, engagement protrusion portion 153a are formed on the outer periphery surface of the stopper ring 153, and the stopper ring 153 is attached to the rim portion 111 by the elastic deformation of the engagement protrusion portion 153a. The circular portion 133 is held by the stopper ring 153 attached to the rim portion 111, so that it can prevent a part of the circular portion 133 from being removed when the bridge portion 134 is broken. In the fifth embodiment, the other parts are similar to those of the above-described first embodiment.

Although the present invention has been fully described in connection with the preferred embodiments thereof with reference to the accompanying drawings, it is to be noted that various changes and modifications will become apparent to those skilled in the art.

For example, in the above-described embodiments, the present invention is typically applied to a torque transmission system transmitting the torque from the engine to the compressor used in an air conditioning apparatus for a vehicle. However, the present invention may also applicable to other torque transmission systems used in fixed air conditioning apparatus or the like.

In the above-described embodiments, the damper 140 is made of the rubber (e.g., EPDM). However, the damper 140 may be made of the other elastic material such as resin.

In the above-described embodiments, the elastic coefficient of the damper 140 is changed by the non-linear characteristic. However, the elastic coefficient of the damper 140 may be changed by a linear characteristic.

Such changes and modifications are to be understood as being within the scope of the present invention as defined by the appended claims.

What is claimed is:

1. A torque transmission system for transmitting torque from a driving unit to a driven unit, the system comprising:
   a first rotation member which is rotated by torque from the driving unit:
   a second rotation member connected to a rotation portion of the driven unit, to be rotated together with the rotation portion of the driven unit;
   a torque transmitting member transmitting torque from the first rotation member to the second rotation member, the torque transmitting member being disposed to be broken when the torque transmitted from the first rotation member is larger than a predetermined torque, wherein the torque transmitting member is connected to the first rotation member through an elastic member; and
   a prevention member disposed to prevent the torque transmitting member from being removed when the torque transmitting member is broken wherein tho prevention member is constructed to transmit force between the first rotation member and the torque transmitting member when the prevention member operates to prevent the torque transmitting member from being removed.

2. The torque transmission system according to claim 1, wherein:
   the rotation portion of the driven unit is a shaft connected to the second rotation member;
   the torque transmitting member is connected to the second rotation member, and is broken to interrupt a torque transmission when the torque transmitted from the first rotation member is larger than the predetermined torque;
   and the prevention member is provided in the torque transmitting member at a side of the first rotation member.

3. The torque transmission system according to claim 2, wherein:
   the torque transmitting member includes a circular portion having a plurality of protrusion portions to which torque supplied from the first rotation member is received, and a bridge portion through which the circular portion is mechanically connected to the second rotation member; and
   the prevention member is provided in the circular portion.

4. The torque transmission system according to claim 3, wherein the prevention member is provided in an outer periphery of the circular portion to be engaged with the first rotation member.

5. The torque transmission system according to claim 3, wherein the prevention member is provided in an outer periphery of the circular portion at a position between two adjacent protrusion portions.

6. The torque transmission system according to claim 3, wherein the prevention member is provided at a distal end of each protrusion portion of the circular portion to be engaged with the first rotation member.

7. The torque transmission system according to claim 1, wherein:
   the torque transmitting member includes a cylindrical portion mechanically connected to the shaft, a circular portion having a plurality of protrusion portions to which torque supplied from the first rotation member is received, and a bridge portion through which the circular portion is mechanically connected to the cylindrical portion; and
   the prevention member is provided in the circular portion to be integrated with the circular portion.

8. The torque transmission system according to claim 7, wherein the prevention member is provided in an outer periphery of the circular portion.

9. The torque transmission system according to claim 7, wherein the prevention member is provided in an outer periphery of the circular portion at a position between adjacent two protrusion portions.

10. The torque transmission system according to claim 7, wherein the prevention member is provided at a distal end of each protrusion portion of the circular portion.

11. The torque transmission system according to claim 7, wherein the prevention member is at least an engagement protrusion piece elastically deformable to engage with a part of the first rotation member.

12. A torque transmission system for transmitting torque from a driving unit to a driven unit, the system comprising:
   a rotation member which is rotated by torque from the driving unit;
   a torque transmitting member connected to a shaft of the driven unit, for transmitting torque from the rotation member to the shaft, the torque transmitting member being disposed to be broken when the torque transmitted from the rotation member is larger than a predetermined torque; and
   a prevention member disposed to prevent the torque transmitting member from being removed when the torque transmitting member is broken, wherein:
   the rotation member includes a rim member having an approximate ring shape for receiving torque, a bearing portion disposed inside the rim member, and a connection portion connecting the bearing portion and the rim member,
   the torque transmitting member includes a cylindrical portion mechanically connected to the shaft, a circular portion having a plurality of protrusion portions to which the torque supplied from the rotation member is received, and a bridge portion through which the circular portion is mechanically connected to the cylindrical portion; and
   the prevention member is a stopper member having an approximate ring shape, and is attached to the rim member to contact the circular portion.

13. The torque transmission system according to claim 12, wherein the stopper member is elastically deformable to press-contact an outer periphery of the circular portion.

14. A torque transmission system for transmitting torque from a driving unit to a driven unit, the system comprising:
   a first rotation member which is rotated by torque from the driving unit:
   a second rotation member connected to a rotation portion of the driven unit, to be rotated together with the rotation portion of the driven unit;
   a torque transmitting member transmitting torque from the first rotation member to the second rotation member, the torque transmitting member being disposed to be broken when the torque transmitted from the first rotation member is larger than a predetermined torque, wherein the torque transmitting member is connected to the first rotation member through an elastic member; and
   a prevention member disposed to prevent the torque transmitting member from being removed when the torque transmitting member is broken, wherein the prevention member is connected directly to one of the torque transmitting member and the first rotation member to transmit force between the first rotation member and the torque transmitting member when the prevention member operates to prevent the torque transmitting member from being removed.

15. A torque transmission system for transmitting torque from a driving unit to a driven unit, the system comprising:
 a first rotation member which is rotated by torque from the driving unit;
 a second rotation member connected to a rotation portion of the driven unit to be rotated together with the rotation portion of the driven unit;
 a torque transmitting member transmitting torque from the first rotation member to the second rotation member, the torque transmitting member being disposed to be broken when the torque transmitted from the first rotation member is larger than a predetermined torque, wherein the torque transmitting member is connected to the first rotation member through an elastic member; and
 a prevention member disposed to prevent the torque transmitting member from being removed when the torque transmitting member is broken, wherein the prevention member engages the torque transmitting member when blocking removal of the torque transmitting member and is disengaged from the torque transmitting member during the torque transmission.

16. A torque transmission system for transmitting torque from a driving unit to a driven unit, the system comprising:
 a first rotation member which is rotated by torque from the driving unit;
 a second rotation member connected to a rotation portion of the driven unit, to be rotated together with the rotation portion of the driven unit;
 a torque transmitting member transmitting torque from the first rotation member to the second rotation member, the torque transmitting member being, disposed to be broken when the torque transmitted from the first rotation member is larger than a predetermined torque; and
 a prevention member disposed to prevent the torque transmitting member from being removed when the torque transmitting member is broken, wherein:
 the first rotation member includes a rim member having an approximate ring shape, a bearing portion disposed inside the rim member, and a connection portion connecting the bearing portion and the rim member; and
 the prevention member is a stopper member having an approximate ring shape, and is attached to the rim member, wherein:
 the torque transmitting member includes a circular portion having a plurality of protrusion portions to which torque supplied from the first rotation member is received, and a bridge portion through which the circular portion is mechanically connected to the second rotation member; and
 the prevention member is attached to the rim member to contact the circular portion.

* * * * *